US006586731B1

(12) United States Patent
Jolliffe

(10) Patent No.: US 6,586,731 B1
(45) Date of Patent: Jul. 1, 2003

(54) HIGH INTENSITY ION SOURCE APPARATUS FOR MASS SPECTROMETRY

(75) Inventor: Charles Jolliffe, Schomberg (CA)

(73) Assignee: MDS Inc., Concord (CA)

( * ) Notice: Subject to any disclaimer, the term of this patent is extended or adjusted under 35 U.S.C. 154(b) by 0 days.

(21) Appl. No.: 09/548,281

(22) Filed: Apr. 12, 2000

Related U.S. Application Data

(60) Provisional application No. 60/128,807, filed on Apr. 12, 1999.

(51) Int. Cl.7 ........................ G01N 27/26; G01N 27/447

(52) U.S. Cl. ........................ 250/288; 250/281; 250/282; 250/299 R

(58) Field of Search ................................ 250/288, 282, 250/281

(56) References Cited

U.S. PATENT DOCUMENTS

| | | | | |
|---|---|---|---|---|
| 4,328,420 A | | 5/1982 | French | |
| 4,814,612 A | | 3/1989 | Vestal et al. | |
| 4,842,701 A | | 6/1989 | Smith et al. | |
| 4,935,624 A | | 6/1990 | Henion et al. | |
| 4,963,736 A | | 10/1990 | Douglas et al. | |
| 4,999,493 A | | 3/1991 | Allen et al. | |
| 5,015,845 A | | 5/1991 | Allen et al. | |
| 5,115,131 A | | 5/1992 | Jorgenson et al. | |
| 5,345,079 A | * | 9/1994 | French et al. | 250/288 |
| RE34,757 E | * | 10/1994 | Smith et al. | 204/299 R |
| 5,373,156 A | * | 12/1994 | Franzen | 250/288 |
| 5,412,208 A | | 5/1995 | Covey et al. | |
| 5,514,868 A | * | 5/1996 | Dixon | 250/282 |
| 5,576,540 A | | 11/1996 | Jolliffe | |
| 5,838,002 A | | 11/1998 | Sheehan | |
| 5,962,851 A | * | 10/1999 | Whitehouse et al. | 250/288 |
| 6,126,086 A | * | 10/2000 | Browner et al. | 239/102.1 |
| 6,166,379 A | * | 12/2000 | Montaser et al. | 250/288 |
| 6,245,227 B1 | * | 6/2001 | Moon et al. | 210/198.2 |
| 6,278,111 B1 | | 8/2001 | Sheehan et al. | |

OTHER PUBLICATIONS

A New Liquid Chromatography/Mass Spectrometry Interface: Laser Spray, by Kenzo Koraoka, Shimpei Saito, Jun Katsuragawa and Ichiro Kudaka, 1998, pp. 1–5.

A new electrospray–ionization time–of–flight mass spectrometer with electrostatic wire ion guide, by P. V. Bondarenko, R.D. Macfarlane, 1996, pp. 241–258.

Crossed–Beam Liquid Chromatograph–Mass Spectrometer Combination, by C.R. Blakley, M.J. McAdams and M.L. Vestal, 1978, pp. 261–276.

From Ions In Solution To Ions In The Gas Phase—The Mechanism of Electrospray Mass Spectrometry, by Paul Kebarle and Liang Tang, 1993, pp. 972–985.

* cited by examiner

*Primary Examiner*—John R. Lee
*Assistant Examiner*—David A. Vanore
(74) *Attorney, Agent, or Firm*—Bereskin & Parr

(57) ABSTRACT

A high intensity ion source for a mass spectrometer is provided having system dimensions and parameters which cause the Taylor cone of a liquid charge stream to pass through an aperture in a lens into a low pressure chamber without substantially desolvating. A capillary tube having an outlet diameter on the order of 50 micrometers is located in an ion source chamber which is maintained at close to atmospheric pressure. The outlet of the capillary tube is positioned at a distance on the order of 250 micrometers from the aperture of the lens. The low pressure chamber is maintained at a pressure on the order of 13 pascals. With a suitable applied field, a Taylor cone ion stream is formed and passes through the aperature in the lens into a low pressure chamber without substantially desolvating. Substantial desolvation of the liquid charge stream is accomplished through the application of heating techniques within the low pressure chamber.

51 Claims, 8 Drawing Sheets

HIGH INTENSITY ION SOURCE APPARATUS FOR MASS SPECTROMETRY

This application claims the benefit of provisional application No. 60/128,807 filed Apr. 12, 1999.

FIELD OF THE INVENTION

The present invention relates to method and apparatus for forming ions from a liquid for use by an analytical instrument, typically a mass spectrometer.

BACKGROUND OF THE INVENTION

Various types of ion sources have been used in the past to produce ions from a liquid for mass spectrometers. Over the last decade the practise has been to produce the ions at or near atmospheric pressure and then to direct the ions into a vacuum chamber which houses the mass spectrometer. Examples of these ion sources include the well known electrospray ion (ESI) source, discussed in U.S. Pat. No. 4,842,701 to Smith et al. and the ion source referred to as ion spray, described in U.S. Pat. No. 4,935,624 to Henion et al.

In its most basic form, an ESI source is created by applying a potential difference on the order of 5000 volts between a metal capillary and an interface lens in which there is an aperture. The distance between the capillary tip and lens is in the range of 1 to 3 centimeters. The analyte is contained in a solvent which is pumped through the capillary. As the liquid emerges from the capillary tip, the high electric field causes charge separation and a subsequent rapid increase of the charged liquid flow velocity accompanied by a sharp reduction of liquid flow diameter, and assuming a shape called a Taylor cone. Within a short distance of the capillary tip, the mutual charge repulsion within the liquid exceeds the ability of the surface tension to contain the liquid, resulting in a scattering of the smooth liquid flow into liquid droplet form. The maximum flow rate of the ESI source is about 5 microliters/minute ($\mu$L/m). Much higher flow rates cause the ion signal to decrease and become unstable because of the advent of larger droplets which take too long to desolvate. Consequently much of the ion current becomes bound up in droplets instead of gas phase ions. ESI sources are typically operated at or near atmospheric pressure, because a high heat transfer rate to the droplets required for evaporation is possible due to the high rate of droplet-air molecule collisions.

Prior art ion spray devices can include a concurrent flow of high velocity gas coaxial with a capillary tube. This gas nebulizes the liquid flowing from the capillary tip, effectively resulting in smaller sized droplets. Adding an external source of heated gas results in the effective evaporation of liquid flow up to 1000 microliters per minute.

In some configurations of ion spray or electrospray sources, the metal capillary has been replaced by a nonconductive capillary such as fused silica. The electrical connection to the liquid is usually made at a metal junction upstream from the capillary tip and relatively close to the tip (e.g. 10 cm).

Although ion spray has replaced electrospray in the flow range from about 1 microliter/minute to 1000 microliter/minute, ESI sources called "nanospray" which use extremely low flows of the 1 to 20 nanoliters per minute range are becoming popular for situations where the amount of sample is limited. The nanospray source is distinguished from the higher flow rate sources by having a smaller capillary diameter, and both a lower distance and potential difference between the capillary tip and the lens. The small nanospray capillary bore produces small droplets which quickly evaporate. For example, a typical nanospray source is placed at a distance of between 1 and 3 millimeters from the lens and a typical electrospray source is placed at a distance of between 1 to 2 centimeters from the lens. In addition, due to the very low flow rate of the nanospray source, a large fraction of the ion current from the capillary passes through the aperture of the lens, whereas for the high flow sources, this same fraction is often less than one percent. In both cases, the ion current through this lens aperture is predominantly in the form of desolvated gas phase ions, that is, not in liquid form.

Regardless of the source design, the sensitivity of all atmospheric source designs generally increases with a larger aperture in the lens. Larger apertures are increasingly used to collect more ion current emerging from the capillary, but with a typical fixed ion/gas ratio of ions and gas through the lens aperture, more gas is present which necessitates higher capacity and costly vacuum pumps to maintain the mass spectrometer vacuum pressure. A typical ion/gas ratio for the atmospheric sources is from one ion in $10^9$ to $10^{10}$ molecules of air, usually nitrogen.

Attempts have been made to increase the number of ions that can be delivered to a low pressure region by providing electrospray directly into a low pressure region as disclosed in U.S. Pat. No. 5,838,002 to Sheehan, where a potential difference is applied across an electrospray capillary positioned in an evacuated chamber of less than 13 pascals and a counter electrode. This approach is limited by corona discharge which can produce chemical noise, and liquid boiling which disturbs the Taylor cone and causes severe signal instability and signal reduction.

Accordingly, there is a need for a method and apparatus for providing an improved flow of ions into vacuum from an electrospray source such that a low volume of gas is admitted into the vacuum chamber along with the ions, such that corona effects are avoided, such that boiling does not occur, and such that the lab footprint of requisite pumping equipment is reduced.

BRIEF SUMMARY OF THE INVENTION

It is therefore an object of the present invention to provide an apparatus for providing gas phase ions in a relatively low pressure region from a liquid, the apparatus comprising:

(a) a capillary tube, said capillary tube having an input for receiving the liquid, a longitudinal bore, and an outlet for discharging said liquid at a preset flow rate into a first region at a relatively high pressure;

(b) a first interface element with an aperture therein and separating said first region from a second region at a relatively low pressure;

(c) an electrode located downstream from the aperture of the capillary tube; and (d) a voltage source for generating a voltage potential between said liquid in the capillary tube and said electrode;

wherein the aperture of the capillary tube is aligned with the aperture of the first interface element and is positioned directly in front of, and in close proximity to, the aperture of the first interface element, whereby, in use, with a sufficient voltage potential applied between the liquid and the electrode to form an electric field sufficient to cause the liquid stream flowing through the outlet of the capillary tube at the preset flow rate to become a charged liquid stream that originates at the aperture of the capillary tube and flows through the aperture of the first interface element into the second region and substantially desolvates into gas phase ions in the second region, and wherein the spacing between the aperture of the capillary tube and the aperture of the first interface element is such that there is minimal expansion of the liquid charge stream in the first region.

In a second aspect, the present invention provides an apparatus for providing gas phase ions in a relatively low pressure region from a liquid including a matrix material, the apparatus comprising:

(a) a capillary tube, said capillary tube having an input for receiving the liquid, a longitudinal bore, and an outlet for discharging said liquid at a preset flow rate into a first region at a relatively high pressure;

(b) pulsing means coupled to the capillary tube for providing a series of pressure pulses to the liquid within the capillary tube to cause said capillary tube to expel a series of liquid charge stream droplets;

(c) a first interface element with an aperture therein and separating said first region from a second region at a relatively low pressure;

(d) desolvation means for desolvating the liquid charge stream droplets into gas phase ions in the second region;

wherein the aperture of the capillary tube is aligned with the aperture of the first interface element and is positioned directly in front of, and in close proximity to, the aperture of the first interface element, whereby, in use, when said pulsing means provides sufficient pulsing action to the capillary tube to cause the liquid stream flowing through the aperture of the capillary tube at the preset flow rate to become a pulsed liquid stream that originates at the aperture of the capillary tube and flows through the aperture of the first interface element into the second region, said desolvation means interacts with said matrix material to create reagent ions and to substantially desolvate said pulsed liquid stream into gas phase ions in the second region, and wherein the spacing between the aperture of the capillary tube and the aperture of the first interface element is such that there is minimal expansion of the liquid stream in the first region.

The present invention also provides a number of other features which can be provided either instead of, or in combination with the feature recited in the preceding paragraph (mounting the capillary tube in a manner such that the liquid charge stream flows through into the second region without substantially desolvating). These features include:

(1) locating the outlet of the capillary tube relative to the aperture and dimension of the aperture such that substantially all of the liquid ion current passes through into the second region, whereby only a small or negligible ion current is detected on the first interface element, i.e. a current which is orders of magnitude less than the ion current flowing into the second region;

(2) providing a diameter for the bore of the capillary tube, at the outlet thereof, in the range of 12–125 micrometers, mounting the outlet from the aperture at a distance in the range 50 to 500 micrometers and providing the aperture with a diameter in the range of 5 to 500 micrometers.

(3) mounting the tip of the capillary tube, including the capillary tube outlet, in a cap, the cap including the aperture and the cap serving to locate the outlet of the capillary tube both axially and radially relative to the aperture, wherein the first interface element includes a bore within which the cap is mounted.

(4) while reference has been made to the use of a capillary tube within the ion source apparatus, it should be understood that instead of using a capillary tube to introduce liquid analyte into the ion source chamber, it would be possible to use any means of introducing a source of liquid analyte into the ion source chamber instead of using a capillary tube.

In a third aspect, the present invention provides a method of forming gas phase ions in a relatively low pressure region from a liquid, the method comprising the steps of:

(a) directing the liquid through a capillary tube having an outlet to provide a liquid stream at a preset flow rate into a first region at a relatively high pressure;

(b) providing an electrode downstream from the aperture;

(c) providing a first interface element including an aperture and separating the first region from a second region at a relatively low pressure;

(d) positioning the capillary tube such that the outlet of the capillary tube is aligned with the aperture of the first interface element and is positioned in front of, and in close proximity to, the aperture of the first interface element;

(e) applying an electric potential between the liquid within said capillary tube and the electrode to form an electric field, sufficient to cause said liquid stream to form a charged liquid stream, whereby the charged liquid stream originates at the outlet of the capillary tube and flows through the aperture of the first interface element into the second region; and (f) locating the outlet of the capillary tube at a distance from the aperture such that there is minimal expansion of the charged liquid stream in the first region and such that substantially all the liquid passes through the orifice, for vaporization in the second region.

In this third aspect of the invention, it is envisaged that, step (f) and, where applicable step (e), could be replaced or combined with one or more of the following features:

(1) causing substantially all the ion current to pass through the aperture, whereby only a relatively small ion current is detected at the interface element;

(2) spacing the outlet of the capillary tube in the range 50 to 500 micrometers from the aperture, and/or providing the outlet of the capillary tube with a diameter in the range of 12 to 125 micrometers, and/or providing the aperture with a diameter in the range of 5 to 500 micrometers;

(3) locating the aperture such that the jet region of the Taylor cone extends through the aperture, or locating the aperture such that at least a portion of the plume region is located in the aperture and may extend, at least partially, into the first region; and (4) causing at least 90% of the sample to pass through the aperture into the second region.

In a fourth aspect, the present invention provides a method of forming gas phase ions in a relatively low pressure region from a liquid containing a matrix material, the method comprising the steps of:

(a) directing the liquid through a capillary tube having an outlet to provide a liquid stream at a preset flow rate into a first region at a relatively high pressure;

(b) providing a first interface element including an aperture and separating the first region from a second region at a relatively low pressure;

(c) positioning the capillary tube such that the outlet of the capillary tube is aligned with the aperture of the first interface element and is positioned in front of, and in close proximity to, the aperture of the first interface element;

(d) applying pressure pulses to the capillary tube to cause said capillary tube to expel a series of liquid charge stream droplets to cause the liquid stream flowing through the aperture of the capillary tube to become a pulsed liquid stream that originates at the aperture of the capillary tube and flows through the aperture of the first interface element into the second region;

(e) locating the outlet of the capillary tube at a distance from the aperture such that there is minimal expansion of the charged liquid stream in the first region and such that substantially all the liquid passes through the aperture, for vaporization in the second region; and (f) desolvating said droplets into gas phase ions in the second region.

Further objects and advantages of the invention will appear from the following description, taken together with the accompanying drawings.

Figure 1:
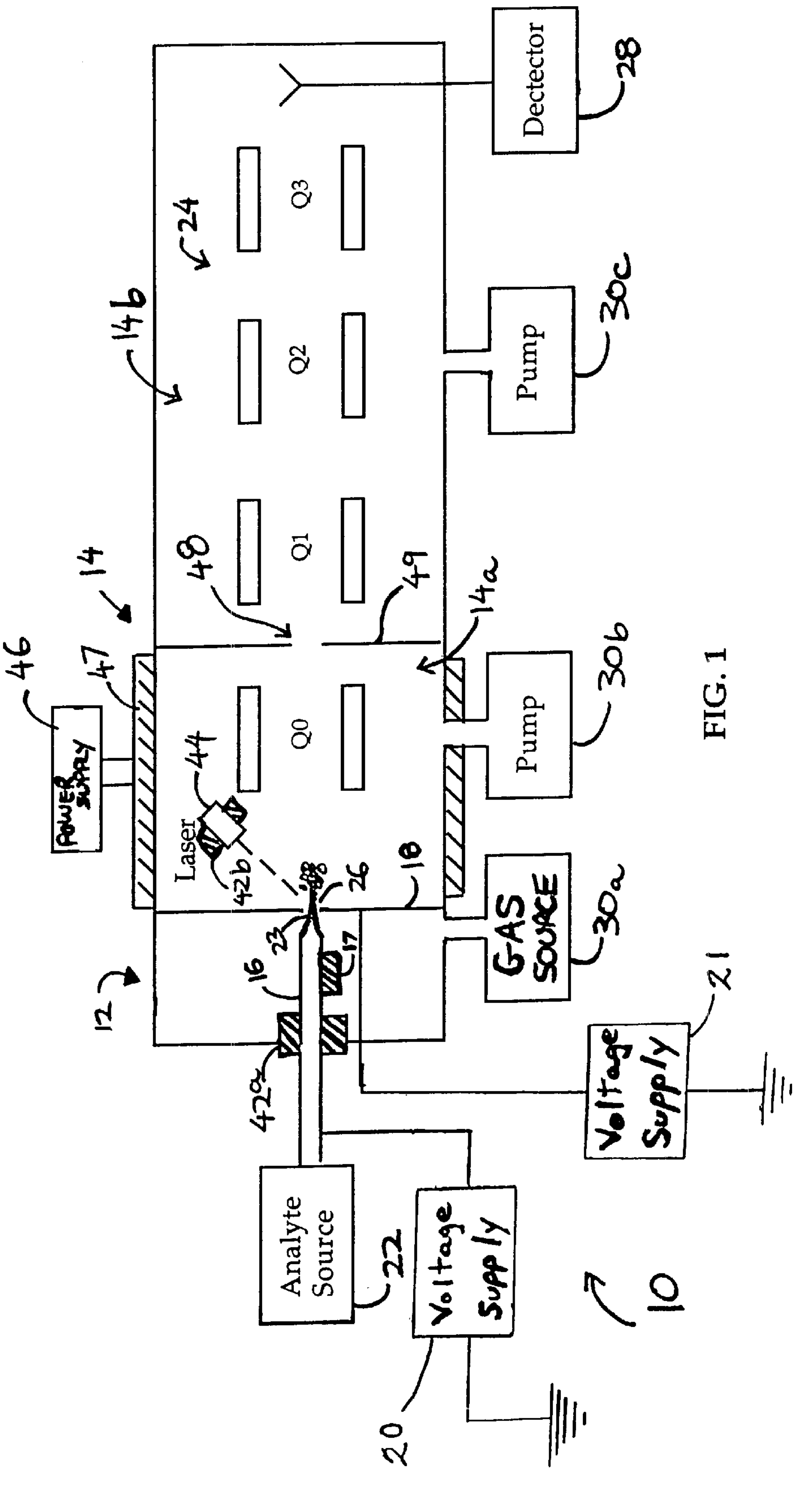
FIG. 1 is a diagrammatic view of an embodiment of the present invention.
Figure 6:
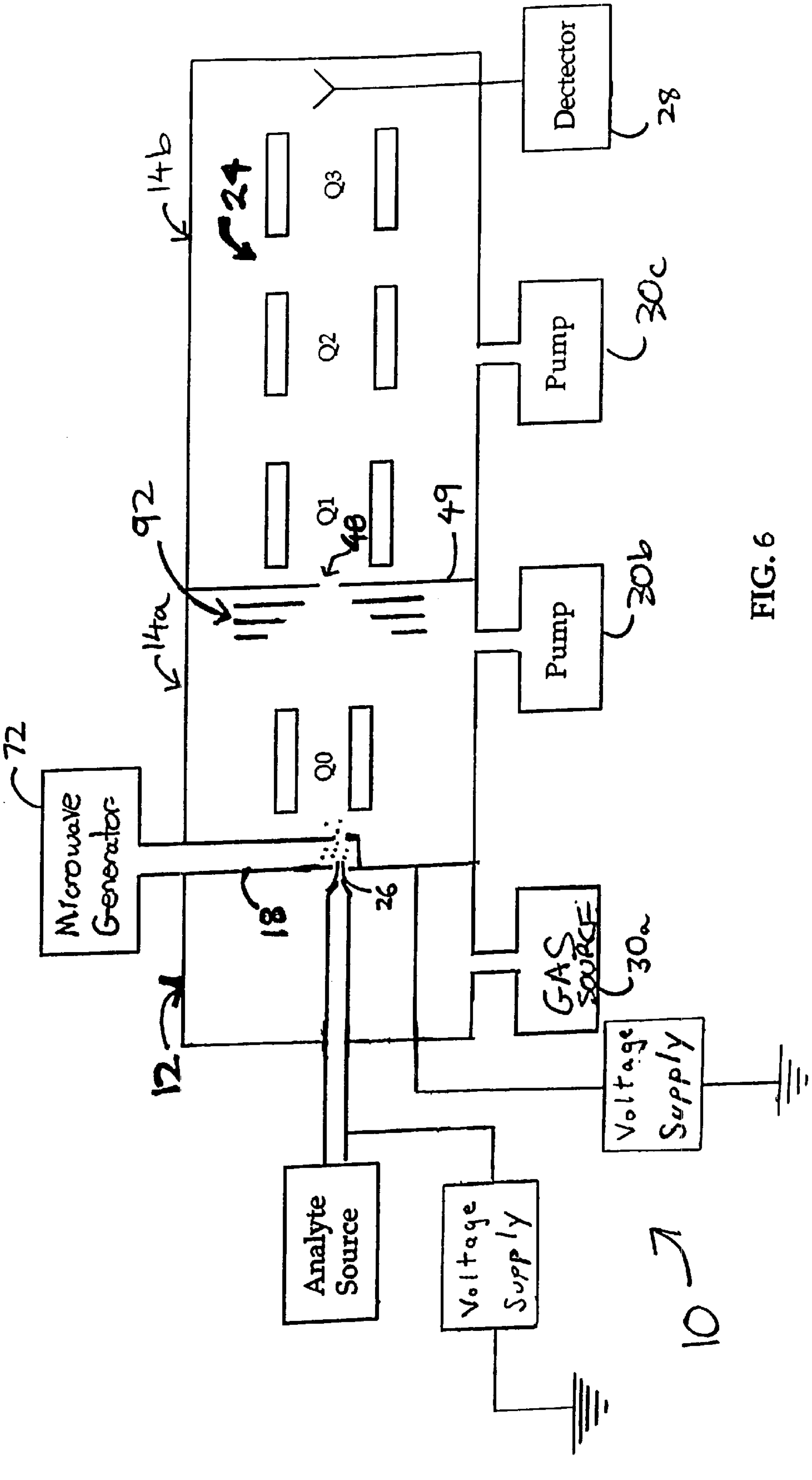
Figure 7:
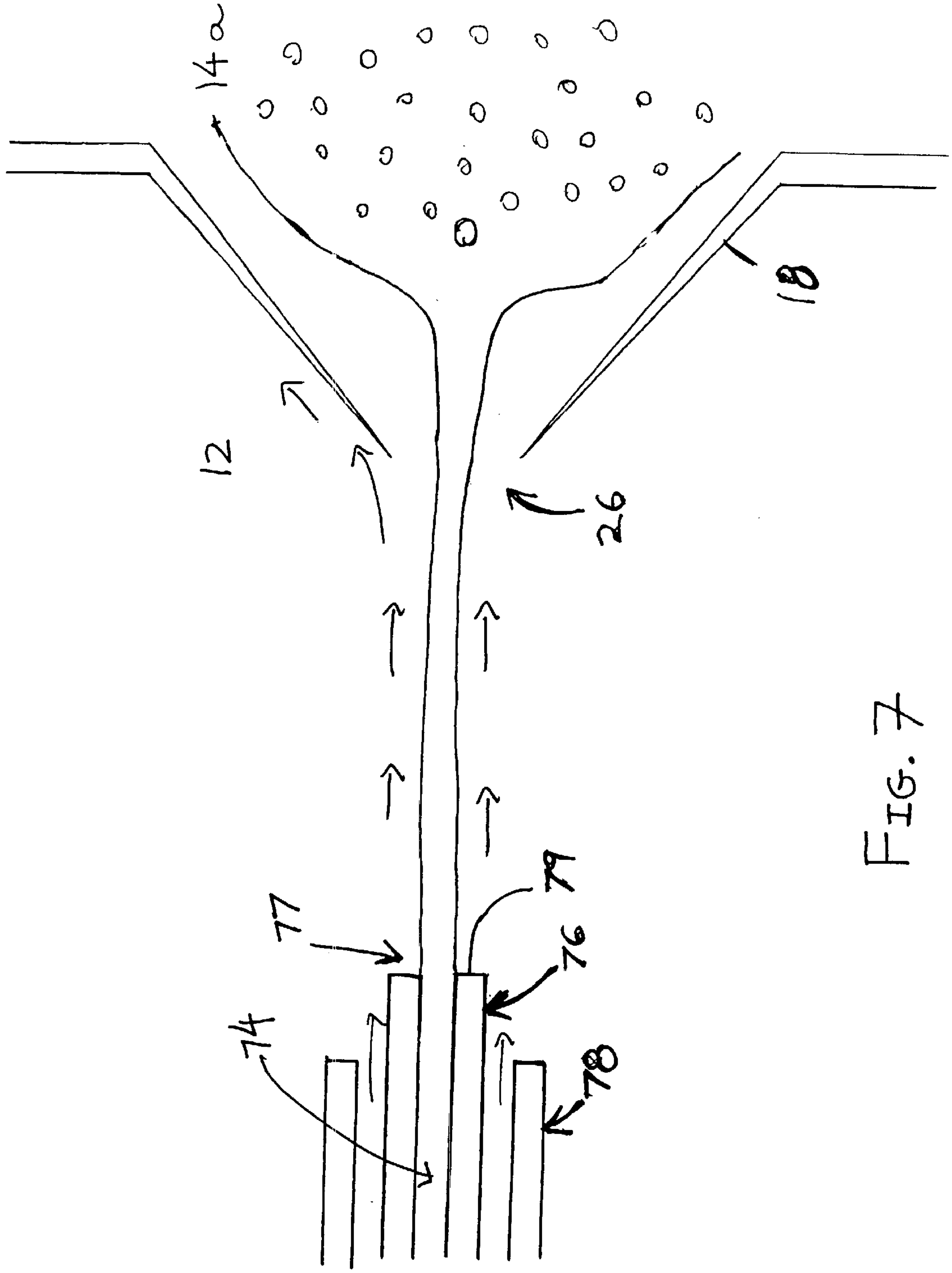

FIG. **5*a* is a diagrammatic view of heating equipment for heating the liquid within the capillary tube of FIG. 1**;

FIG. **5*b* is a diagrammatic view of alternative heating equipment for heating the liquid within the capillary tube of FIG. 1**;

FIG. 6 is a diagrammatic view of the ion source apparatus of FIG. 1 in association with a microwave generator; and FIG. 7 is a diagrammatic view of a further embodiment of the present invention utilizing ion spray.

DETAILED DESCRIPTION OF PREFERRED EMBODIMENTS

Figure 2:
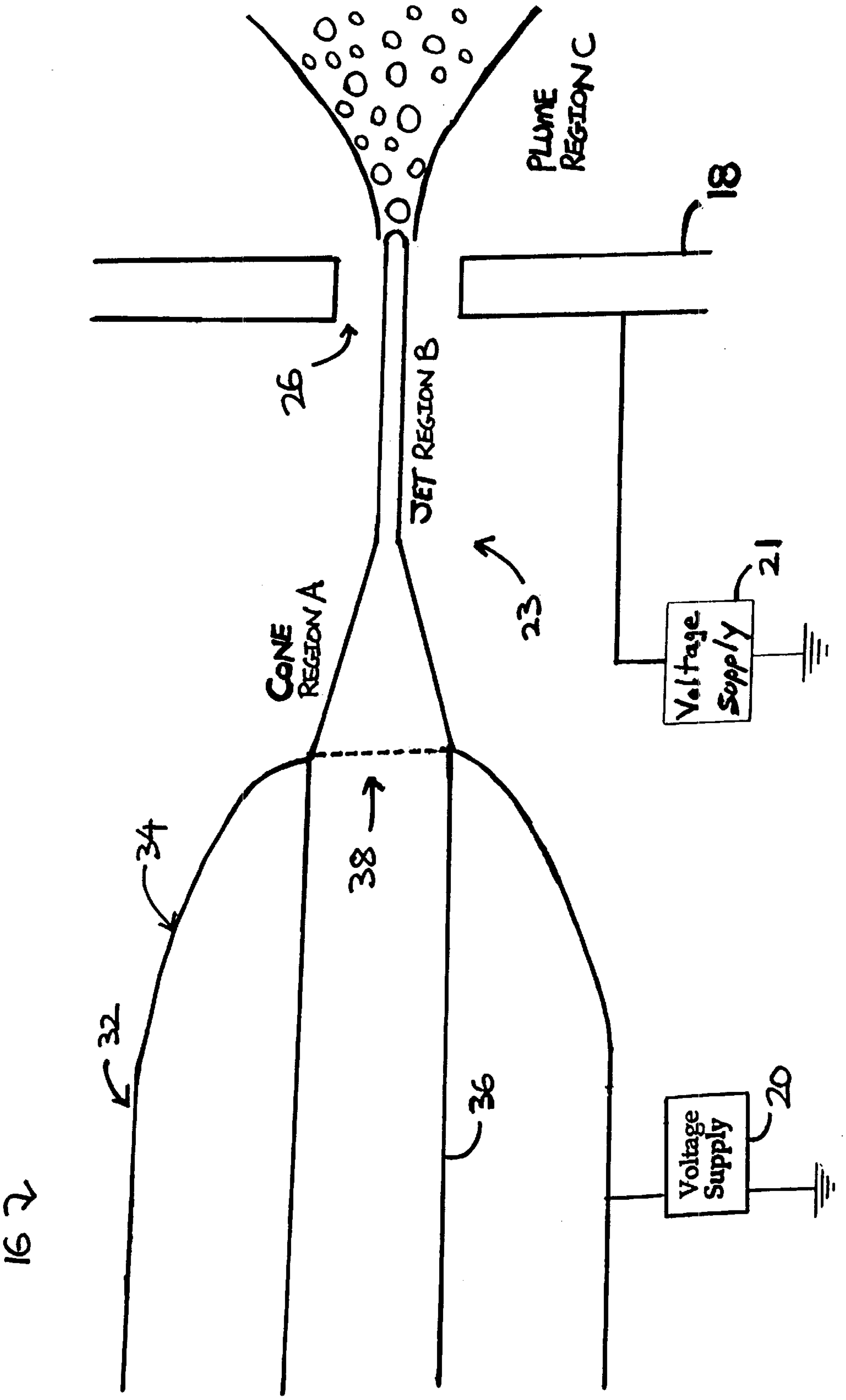
FIG. 2 is a more detailed diagrammatic view of the capillary tube, the liquid charge stream and the first interface element lens of FIG. 1.

Reference is first made to FIGS. 1 and 2, which show a high intensity ion source apparatus 10 according to a preferred embodiment of the present invention. Ion source apparatus 10 contains an ion source chamber 12 and a vacuum chamber 14.

Ion source chamber 12 contains a capillary tube 16 positioned in front of a first interface element or lens 18 which separates ion source chamber 12 from vacuum chamber 14. First interface element or lens 18 includes an aperture 26. The capillary tube 16 receives liquid analyte (e.g. for test purposes, a small flow of Minoxidil or Reserpine dissolved in solvents such as methanol, acetonitrile, and the like) from an analyte source 22 which may be any appropriate source of liquid analyte, such as a small container of analyte, or eluent from a liquid chromatograph or capillary electrophoresis instrument. Voltage supplies 20 and 21 are connected to capillary tube 16 (and hence to the liquid within) and lens 18, respectively. In order to provide a high electric field at capillary tip 34 (FIG. 2), these voltage supplies are adjusted to provide a high voltage potential difference, typically between 500 and 1600 volts (e.g. 1300 volts).

After charging the liquid at the capillary tube outlet 38, the high electric field applied to capillary tube 16 pulls the charged liquid from capillary tube 16 to produce a liquid charge stream 23 which subsequently disperses into a cloud of charged droplets, according to the well known method of electrospray. Upon evaporation of the charged droplets, gas phase ions are formed. The various physical and electrical characteristics associated with liquid charge stream 23 will be further described in relation to FIG. 2.

Gas source **30*a* maintains ion source chamber 12 at a pressure of between $10^5$ pascals (i.e. atmospheric pressure) and $2\times10^5$ pascals (i.e. 2 atmospheres). As the pressure is increased above atmosphere (e.g. to 1.5 atmospheres), the possibility of arcing between capillary tip 34 and lens 18 is reduced. At 1.5 atmospheres, 50 percent more gas accompanies liquid charge stream 23 in ion source chamber 12 than would be the case at atmospheric pressure. This increase in gas load is practically acceptable in view of the operational benefits as will be discussed. Gas source 30*a*** is typically $N_2$, but can also be air.

Vacuum chamber 14 comprises a first vacuum chamber **14*a* and a second vacuum chamber 14*b*. The lens 18 of first vacuum chamber 14*a* contains aperture 26 which is sized to completely receive the Taylor cone of the liquid charge stream 23. Second vacuum chamber 14*b* houses a mass spectrometer 24 which can be any kind of mass spectrometer, such as an ion trap, a time-of-flight mass spectrometer, or a quadrupole mass spectrometer. By way of example, FIG. 1 depicts first and second vacuum chambers 14*a* and 14*b* and shows the positioning of quadrupole rods of a conventional tandem mass spectrometer of the kind which includes an entrance rod set Q0, a first resolving rod set Q1, a second rod set Q2, a fragment ion resolving rod set Q3, and an ion detector 28**.

First vacuum chamber **14*a* (i.e. regions of containment and desolvation) may be maintained at a pressure of approximately 25 pascals by pump 30*b*. Second vacuum chamber 14*b* (i.e. for containing the mass spectrometer) may be maintained at a pressure on the order of 10–2 pascals using pump 30*c*. Typically, the second vacuum chamber 14*b*** (i.e. containing the mass spectrometer) is maintained at a pressure which is appropriate to the type of mass spectrometer. For example, as is conventionally known, quadrapole rod sets for mass analysis need to be maintained at approximately 1.33 millipascals, whereas ion traps should be maintained at approximately 133 millipascals.

FIG. 2 is a more detailed drawing showing the physical geometry of liquid charge stream 23 as discharged by capillary tube 16 (not to scale). The outside diameter of capillary tube 16 tapers from a body 32 to a tip 34 such that tip 34 has a relatively smaller diameter than that of body 32. Capillary tube 16 has a capillary bore 36 formed throughout, such that liquid analyte from the analyte source 22 flows therein. Capillary bore 36 terminates in an outlet 38 formed in tip 34 thereof, from which the liquid charge stream 23 emanates. Capillary tube 16 can be made of any suitable material, such as steel, conducting polymers, fused silica, and glass (e.g. soda lime glass, borosilicate glass). Tips 34 constructed of fused silica or glass are often metallized with a material such as gold, silver, or platinum by processes such as sputtering or vapour deposition.

The characteristic geometry of the electrospray liquid charge stream, conventionally called a Taylor cone, is formed when liquid charge stream 23 emerges from capillary tube 16 at high electrical field. The liquid charge stream 23 accelerates towards lens 18 and assumes the characteristic conical geometry (Region A). At the apex of the cone, a high velocity jet emerges (Region B) which subsequently breaks into highly charged droplets (Region C). As will be further described, the highly charged droplets in Region C are generally evaporated with dry gas or heat to produce rapid droplet desolvation and formation of gas phase ions. In effect, the electric field pulls liquid charge stream 23 from capillary tube 16 to produce a cloud of charged droplets so that upon evaporation, gas phase ions will be formed. While it is desirable to adjust the system parameters of ion source apparatus 10 such that Region C of the Taylor cone is completely positioned within first vacuum chamber 14*a*, it should be understood that it would also be beneficial to adjust system parameters such that a lesser portion of Region C is provided to vacuum chamber 14*a*, i.e. so an initial portion of Region C is within the ion source chamber 12, as long as substantial desolvation of liquid charge stream 23 can be still be said to occur within vacuum chamber 14*a*. The extent to which Region C can commence in, or be partially located in, the first vacuum chamber 14*a* will depend on the size of the aperture 26 and the extent to which one can tolerate a loss of sample due to impingement of the periphery of the expanding Region C on the interface element or lens 18.

For conductive capillaries, tip 34 should be of conical shape where liquid charge stream 23 emerges, so that a single Taylor cone liquid charge stream 23 is emitted from outlet 38. For example, a flat tip on capillary tube 16 tends to produce an unstable Taylor cone liquid charge stream 23 because the electric field concentrates on the outer edges. Accordingly, the diameter of body 32, which is greater than the diameter of tip 34, tapers from the body 32 to the tip 34 to form a uniform conical section.

The outer diameter of body 32 is preferably 180 micrometers but can have any reasonable dimension. The inner diameter of bore 36 is preferably 50 micrometers to accommodate a flow rate of between 0.5 microliters per minute and 5 microliters per minute but may range anywhere from between 12 micrometers and 125 micrometers. Outlet 38 of capillary tube 16 is positioned from aperture 26 of lens 18 at a distance of between 50 micrometers and 500 micrometers, and preferably at 250 micrometers (recognizing that the lens 18 can have a significant thickness, this distance is measured from the face of the lens 18 bounding the chamber 12). It should be noted that it has been experimentally determined that it is beneficial to adjust the distance between the capillary tip 34 and the aperture 26 of lens 18 such that it is less than 10 times the length of the Taylor cone.

For nonconductive capillaries, the shape of the capillary tip is of less significance, but a conical shape is preferred, so that the emerging liquid tends to form a single Taylor cone.

Lens 18 has aperture 26 with a diameter of between 5 and 500 micrometers, and preferably a diameter of approximately 50 micrometers. As previously described, the lens aperture diameter is sized appropriate to the diameter of the Taylor cone. The diameter of aperture 26 will be larger than the Taylor cone ion stream "waist", or the minimum diameter of charge liquid stream 23. As the diameter of aperture 26 is made smaller, the gas load from ion source chamber 12 to first vacuum chamber 14*a* is decreased, thereby reducing the pumping speed and cost of vacuum pump 30*b*. The alignment of liquid charge stream 23 passing through outlet 38 with aperture 26 is performed using an adjuster 42*a* (shown in FIG. 1), as is conventionally known.

As described above, system parameters, including the spacing of capillary tip 34 from lens 18 must be such that the Taylor cone extends into vacuum chamber 14 and that substantial desolvation of liquid charge stream 23 occurs within vacuum chamber 14*a*. According to this technique, liquid ions and solvent droplets are provided to the low pressure region of first vacuum chamber 14*a* from the high pressure region of ion source chamber 12, with minimal desolvation occurring within ion source chamber 12. Specifically, the length of the Taylor cone is dependent on the liquid flow rate, the liquid surface tension and charge density of the liquid. Surface tension of the liquid depends on the type and temperature of the liquid, and the pressure of the surrounding gas. Charge density of the liquid depends on the composition of the liquid, and on the amount of electric field applied at capillary tip 34.

Liquid charge stream 23 is pumped through capillary tube 16 at generally a constant rate of flow by the pump associated with analyte source 22 (not shown). While a maximum flow rate of 2 microliters per minute is preferred, other flow rates up to about 5 microliters per minute can be accommodated. For an orifice diameter of 25 to 50 micrometers, it is preferred that voltage sources 20 an 21 provide a potential difference between capillary tube 16 and lens 18 of between 500 volts and 1600 volts.

As shown in FIG. 2, the large electric field at capillary tip 34 not only causes charge separation in the tip, it also causes the resulting charged liquid flow velocity to increase as the liquid leaves the capillary tip 34. Due to conservation of mass and the high incompressibility of liquids, as the flow velocity increases, the diameter of the liquid stream decreases as shown. Eventually the mutual repulsion of the contained charges overcomes the liquid surface tension, at which point the liquid stream disperses into a series of charged droplets inside the vacuum chamber 14*a*, as shown.

Referring back to FIGS. 1 and 2, and using the system dimensions and parameters listed in the following table, the Taylor cone of liquid charge stream 23 has been observed to pass through aperture 26 into the vacuum chamber 14 before breaking down into charged droplets, resulting in substantially increased ion current, and decreased gas load due to the much smaller aperture 26 that can be used.

| Parameter | Approximate Value | Parameter | Approximate Value |
|---|---|---|---|
| diameter of body 32 | 117 micrometers | ion source vacuum chamber pressure | $10^5$ pascals |
| diameter of bore 36 (and outlet 38) | 50 micrometers | first vacuum chamber pressure | 13 pascals |
| diameter of aperture 26 | 50 micrometers | voltage applied between capillary 16 and lens 18 | 1300 volts |
| distance between outlet 38 and aperture 26 | 250 micrometers | | |

Specifically, standard solutions, Minoxidil and Reserpine, were each provided at a concentration of about 100 picograms per microliter at a flow rate of 2 microliters per minute and electrosprayed within ion source apparatus 10 having the above noted system dimensions and parameters. When these solutions were electrosprayed from atmosphere through aperture 26 into first vacuum chamber 14*a* at a pressure of 13 pascals, the Q0 rod set, used as a Faraday cup for measuring the ion current, measured ion currents of $80\times10^{-9}$ amperes and $100\times10^{-9}$ amperes, respectively. In contrast, ion currents produced under typical electrospray or ion spray conditions are approximately $2.5\times10^{-10}$ amperes.

Accordingly, ion current increases of 300 to 400 times can be achieved. When outlet 38 is properly aligned with aperture 26, no significant ion current is detectable on the lens 18, i.e., less than one percent of the maximum, which is indicative of negligible losses due to any of the Taylor cone striking lens 18. The ion/gas ratio for the experimental setup described above was determined to be 1 ion per $10^7$ molecules, a 1000 fold increase over typical ion source systems.

With a relatively small vacuum pump, namely a 50 1/s vacuum pump for pump 30*b* (FIG. 1), upon turning on the liquid analyte flow, a five percent pressure increase in vacuum chamber 14*a* was observed from 1.04 to 1.09 pascals using an aperture 26 of 50 micrometers. Therefore solvent pressure increases were observed to be relatively minor compared with the gas flow from ion source chamber 12. If first vacuum chamber 14*a* is maintained at a higher pressure, such as 133 pascals, the pumping demand is lowered and accordingly a less expensive pump 30*b* can be used.

Figure 3:
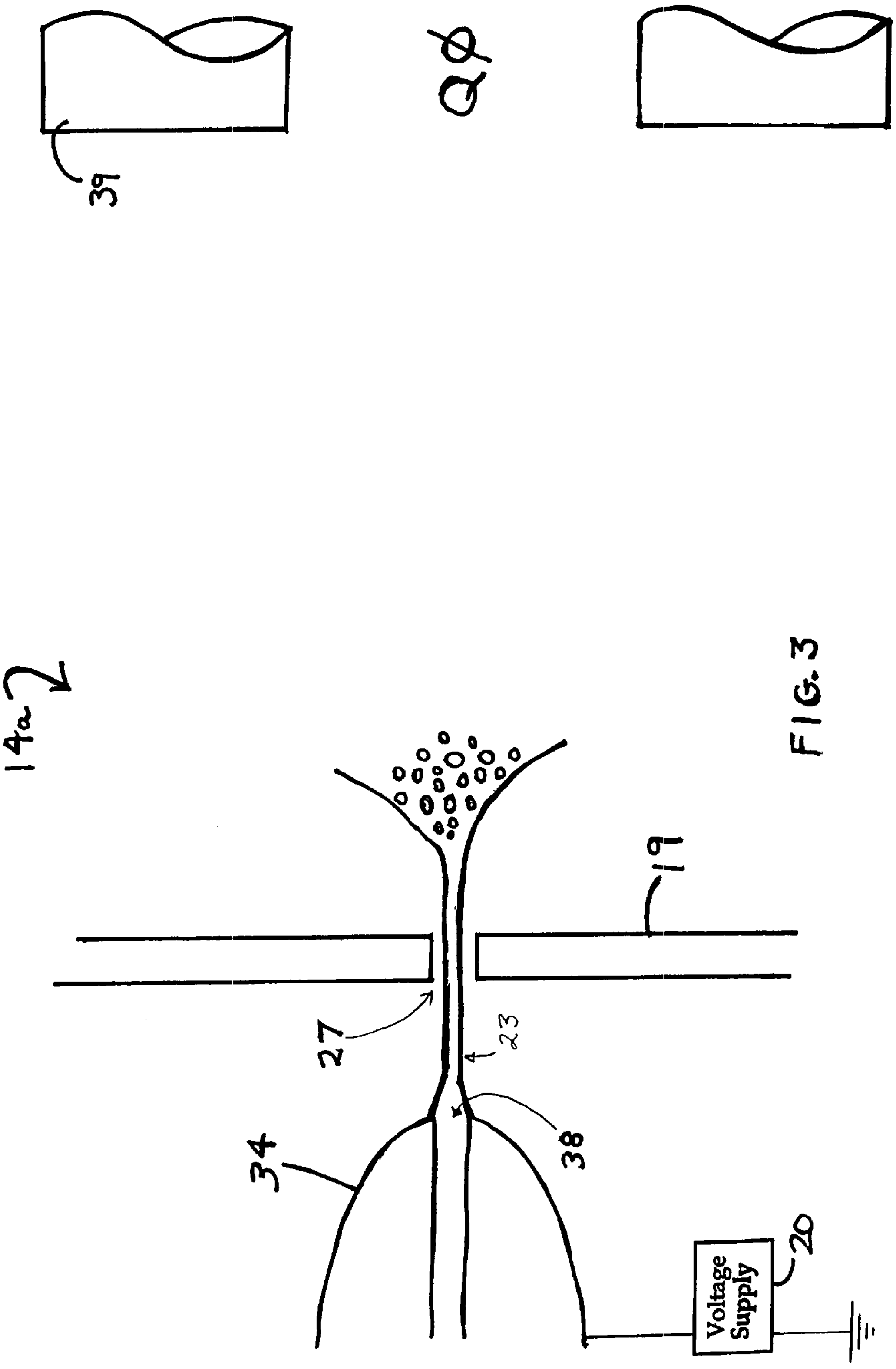
FIG. 3 is a more detailed view of the capillary tube of FIG. 1 in association with an interface element barrier.

It is not necessary to use voltage supply 20 to apply a voltage differential across capillary tube 16 and first interface element lens 18. Specifically, as shown in FIG. 3, a nonconductive interface element "barrier" 19 and a counter-electrode 39 comprising the Q0 assembly, maintained at an appropriate potential by voltage supply 20, positioned downstream from the interface element barrier 19, can be used in place of the conductive lens 18 discussed above. It should be understood that any conductive element may form the counter-electrode 39.

Specifically, an ESI source having a flow rate of approximately 2 microliters per minute with a capillary tip 38 is shown approximately 0.125 millimeters away from an aperture 27 in nonconductive interface element barrier 19. Interface element barrier 19 has an aperture diameter of approximately 50 micrometers. When counter-electrode 39, is placed approximately 15 millimeters downstream of the capillary tip, a Taylor cone ion charge stream 23 is produced that does not disperse into droplets until it enters first vacuum chamber 14*a*.

Conventional electrospray conditions are provided to the apparatus, i.e., the flow rate is approximately 2 microliters per minute and approximately 5000 volts is applied between the capillary and downstream counter-electrode 39. It should be noted that aperture 27 of nonconductive interface element barrier 19, positioned about the Taylor cone ion charge stream 23, maintains the pressure differential between the atmospheric and vacuum regions. This configuration is advantageous in the case where the length of the Taylor cone is variable due to changes in the composition of the liquid, as is the case with a liquid chromatograph (gradient run) having different operational modes. This design is also much less susceptible to electrical breakdown due to mechanical or electrical misadjustment. One possible disadvantage could be the occurrence of surface charging of the interface element barrier 19 but this could be avoided by making appropriate adjustments to system conditions, such as increasing the diameter of aperture 27 (e.g. 150 micrometers). Although increasing the diameter of aperture 27 will increase the gas flow necessitating a larger vacuum pump, this will result in a higher tolerance of alignment between capillary bore 36 and aperture 27.

Figure 4:
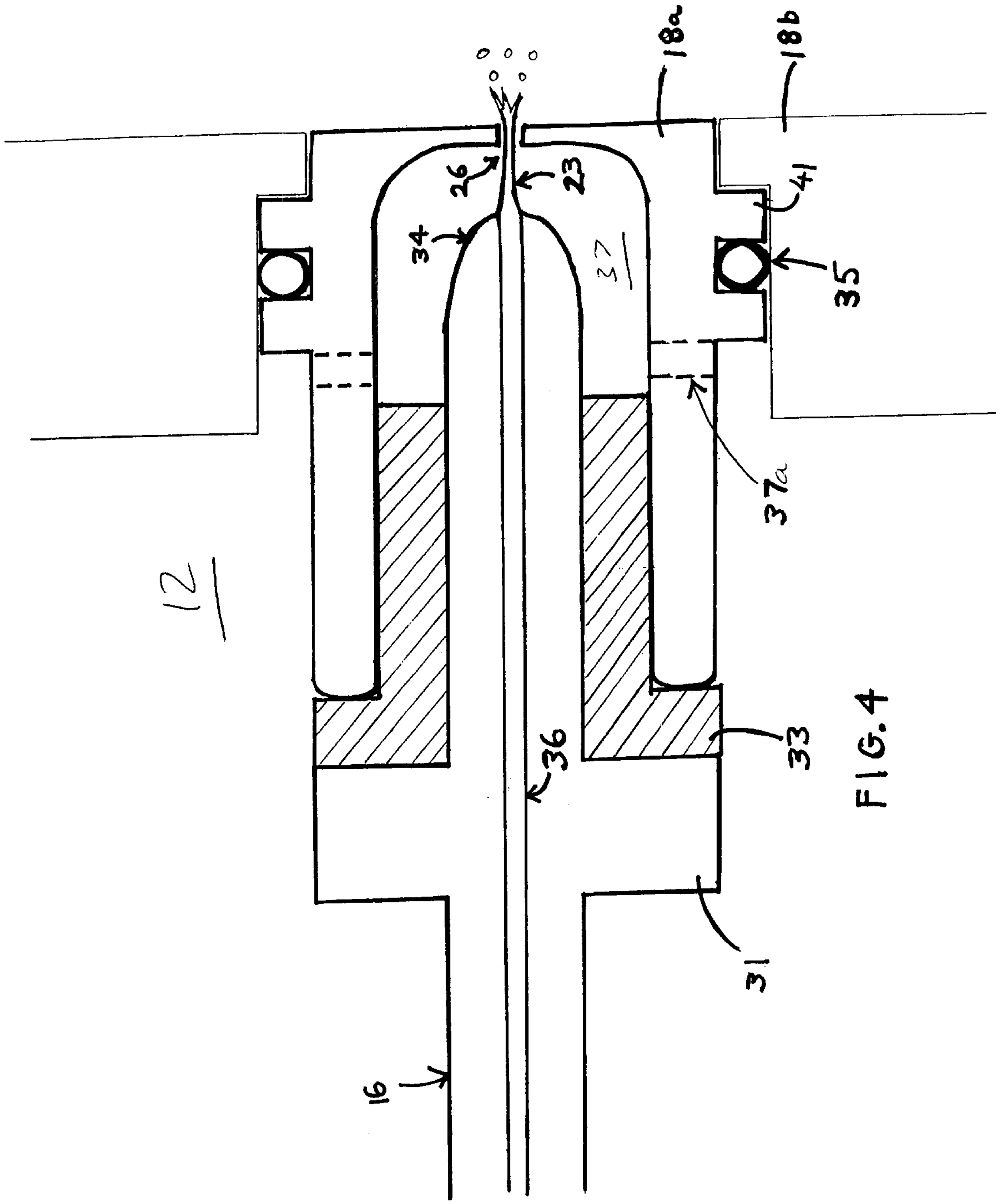
FIG. 4 is a diagrammatic cross-sectional view of the capillary tube of FIG. 1 in association with an interface element cap.

FIG. 4 shows one way of simplifying the task of aligning capillary outlet 38 with either aperture 26 of lens 18 of FIG. 2 or aperture 27 of barrier 19 of FIG. 3. As shown, a generally cylindrical interface cap 18*a* is provided which fits over capillary tip 34 and into the lens 18 or barrier 19, with the lens 18 indicated at 18*b* in FIG. 4. The capillary tube 16 is adapted to fit within the cylindrically symmetric cap 18*a*, with the capillary tube 16 being separated from cap 18*a* by a section of insulator 33. A shoulder 31 on capillary tube 16 locates capillary tube 16 and surrounding insulation 33, axially within cap 18*a*.

Cap 18*a* is secured in place in a suitably dimensioned opening in a lens support 18*b* of lens 18. Again, a shoulder 41 on lens cap 18*a* abuts a shoulder of the lens 18*b* and locates the cap 18*a* axially within lens support 18*b* and hence locates the entire assembly within lens 18. An "O" ring 35 around the cap 18*a* prevents gas leakage from ion source chamber 12 into the first vacuum chamber 14*a*. Holes 37*a* in cap 18*a* maintain the pressure in a tip chamber 37 at substantially the same pressure as chamber 12, here atmospheric pressure. The tip chamber 37 is defined by the end of the capillary 16 and the cap 18*a*, and the Taylor cone. The aperture 26 is now provided in the cap 18*a* and this liquid charge stream 23 assembly allows for the accurate and stable alignment of capillary bore 36 with aperture 26 of cap 18*a*, such that a fixed distance between capillary tip 34 and aperture 26 can be maintained.

Referring back to FIG. 1, as liquid charge stream 23 enters into vacuum chamber 14 through aperture 26, the desolvation of liquid charge stream 23 can be greatly assisted by use of a laser 44 having a beam directed at the emerging liquid charge stream 23 as shown. Laser 44 can be any appropriately powered laser, such as the model 48-5, Duo-Lase 50 W continuous infrared laser (10.6 micrometers). The laser beam of laser 44 is appropriately focused onto liquid charge stream 23 as it enters vacuum chamber 14 through aperture 26. For certain applications it may be more appropriate to use a pulsed laser. Due to the high liquid velocity at the end of the Taylor cone of liquid charge stream 23, the laser repetition rate would be in the kilocycle range for maximum efficiency.

It will be appreciated that, in principle, any source of electromagnetic radiation can be provided which has a wavelength that is absorbed by the liquid, and for this purpose the liquid can include substances to increase the adsorption of radiation. Other light sources could be used, or a microwave source as detailed below. The beam from such a source can be arranged to intersect the Taylor cone charge stream 23 at an angle, or it could be more or less axially aligned with the charge stream.

The relative position of the output beam of laser 44 with respect to liquid charge stream 23 can be adjusted using the micrometer screws of adjusters 42*a* and 42*b* to adjust the position of the capillary tube 16 and the laser, respectively, as is conventionally known. It should be noted that laser 44 could also be located within ion source vacuum chamber 12 such that the laser beam is focused on liquid charge stream 23 in close proximity to aperture 26. It would be necessary to ensure that the diameter and the power of the laser beam of laser 44 does not cause excessive radial expansion of liquid charge stream 23 beyond the dimensions of aperture 26, i.e., to prevent significant amounts of ion current from appearing on the lens 18.

It should be understood that it would also be possible to combine a "matrix" material with the analyte liquid in solution as a variation of the well known matrix assisted laser desorption ionization (MALDI) to ionize the analyte by fast ion-analyte reactions, although here the "matrix" must permit a solution to be formed rather than a solid. Essentially, the "matrix" material is selected to absorb energy from the laser beam for the express purpose of creating reagent ions. The liquid in this instance is usually not charged, i.e., there is no large electric field at the capillary tip. In addition to creating reagent ions via the matrix, the laser energy also desolvates the liquid. It should be understood that the matrix actually promotes ionization as it surrounds the large analyte molecules so that the fast laser energy creates intact gas phase analyte molecules which are subsequently ionized by collisions with reagent ions. It should also be understood that by attaching a conventionally known piezoelectric device 17 (FIG. 1) to capillary body 32, pressure pulses can be applied to the liquid within capillary tube 16 of FIG. 1. In this way, capillary tube 16 may act as a single droplet generator, whose pulse frequency can be synchronized with that of a pulse laser.

Still referring to FIG. 1, upon entering vacuum chamber 14, the ions are focussed by appropriate potentials on the AC-only rod set Q0 and guided from first vacuum chamber 14*a* through the interchamber aperture 48 in a second interface lens 49 into second vacuum chamber 14*b* containing rod set Q1. An AC RF voltage (typically at a frequency of about 1 MHz) is applied between the rods of rod set Q0, as is well known, to permit rod set Q0 to perform its guiding and focusing function. Both DC and AC RF voltages are applied between the rods of rod set Q1 so that rod set Q1 performs its normal function as a mass filter, allowing only ions of selected mass to charge ratio to pass through to the second rod set Q2 for detection by ion detector 28.

In known manner, if rod set Q2 is enclosed and configured as a collision cell, the precursor ions, selected by rod set Q1, can be fragmented by rod set Q2 and further mass analyzed by rod set Q3. This gives a known MS/MS result.

As previously discussed, reasonably low pressures must be maintained in first and second vacuum chambers 14*a* and 14*b* to ensure the proper transmission of ions through vacuum chamber 14. If the pressure within vacuum chamber 14 is increased outside the preferred range, ion signal and/or resolution falls off substantially.

For certain applications, it is useful to maintain the temperature of liquid charge stream 23 as high as practical possible, to increase desolvation of the droplets that are eventually formed in vacuum chamber 14*a*. Increasing the temperature of the ion charge stream 23 can be achieved by applying heat to the capillary tube 16 to heat the liquid inside. The liquid inside capillary tube 16 can be heated using piezoelectric heating, microwave heating, ultrasonic heating, and infrared heating.

Figure 5A:
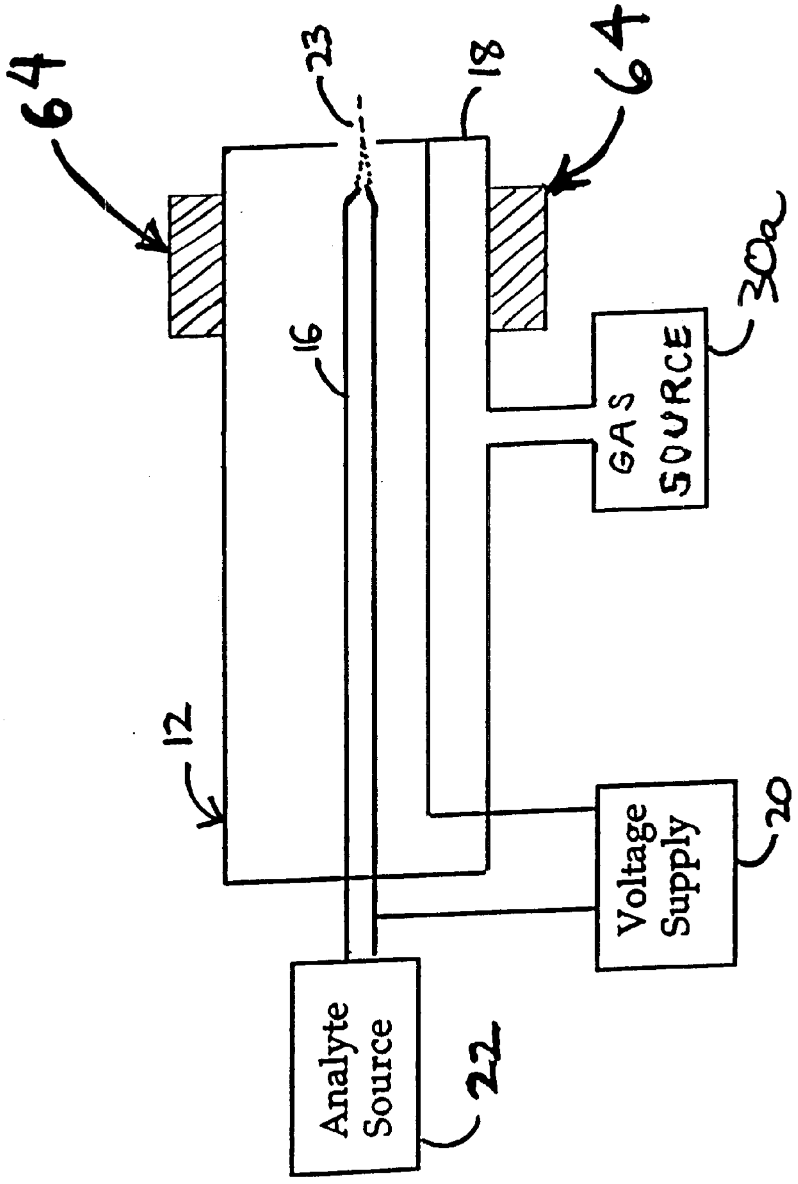

FIG. 5*a* shows the conventionally known method of heating the liquid flowing through capillary tube 16 by heating capillary tube 16 by heating ion source chamber 12, as shown by band heater 64. The pressure and composition of gas(es) within ion source chamber 12 are controlled by a gas manifold (not shown).

Gas source 30*a* is used to provide a gas (e.g. $N_2$) to maintain ion source chamber 12 at a pressure of between $10^5$ pascals (i.e. atmospheric pressure) to $2\times10^5$ pascals (i.e. two atmospheres). Gas source 30*a* is typically $N_2$, but other gases which are more effective at suppressing discharges or heat transfer characteristics can also be used. Pressures over atmosphere also act to suppress discharges, especially in the case where negative ions are being generated. Using this configuration, first vacuum chamber 14*a* can be maintained at a relatively low pressure of approximately 25 pascals.

Figure 5B:
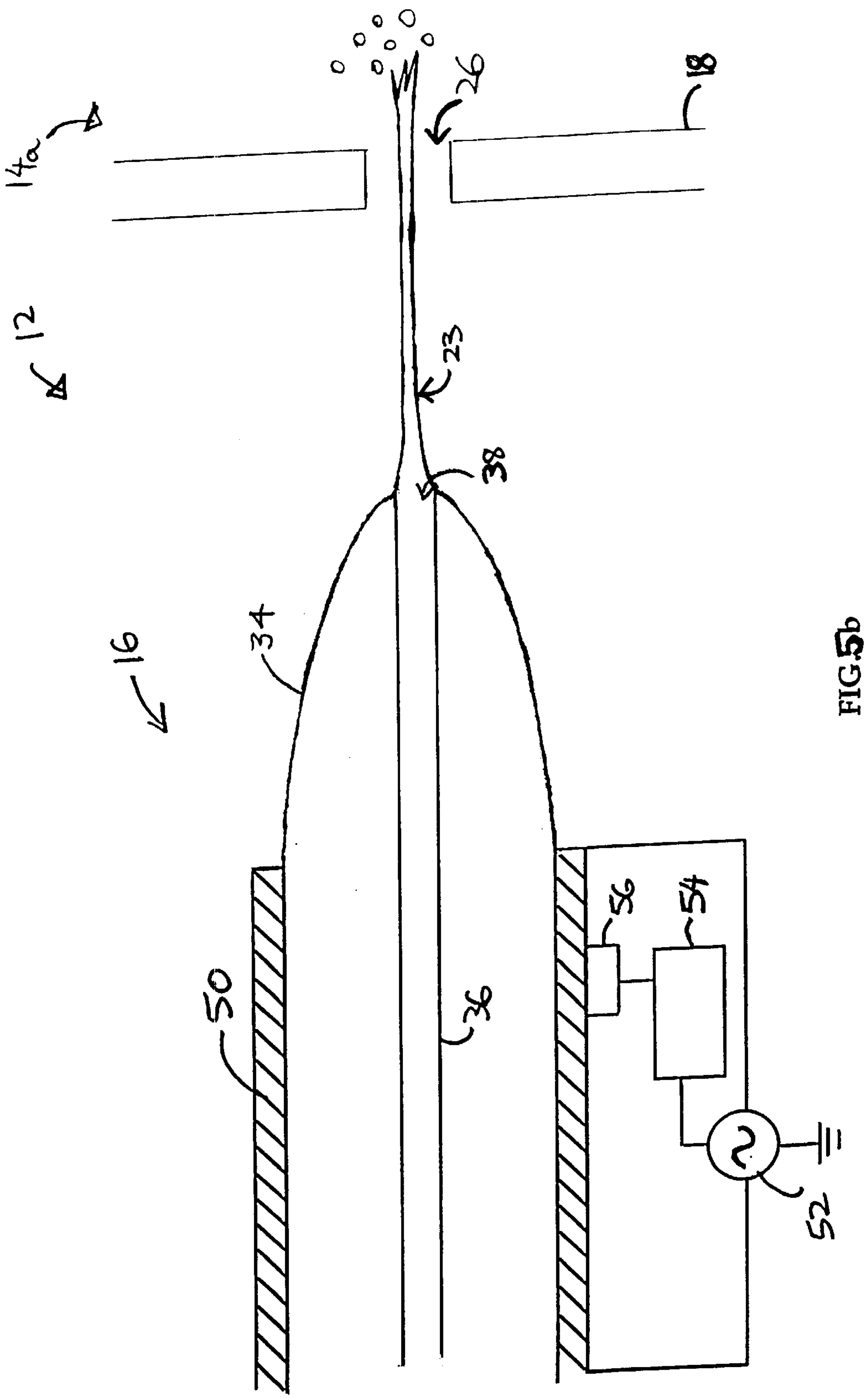

FIG. 5*b* shows an alternative method of heating the liquid in capillary tube 16, as described in U.S. Pat. No. 4,935,624, the contents of which are hereby incorporated by reference. Capillary tube 16 is enclosed within a heater tube 50 and heated directly by a low voltage high current power supply 52 using a feedback controller 54 to regulate power supply 52. As shown, the temperature of heater tube 50 is controlled by thermocouple 56. This method of capillary heating is more controllable than the heating method described in relation to FIG. 5*a*.

Ion source chamber 12 can also be provided with heated gas by coupling a heating element to the gas delivery tube of gas source 30*a*, shown coupled to ion source chamber 12 in FIG. 1. Specifically, this can be accomplished using a conventional stainless steel tube (not shown) with appropriate dimensions (e.g. having a diameter of approximately 3.17 millimeters) wrapped around a cylindrical heater (not shown) such that the tip of the tubing expels hot $N_2$ gas directly at capillary tip 34. This approach ensures that clean gas accompanies the liquid charge stream 23 into first chamber 14*a*, and that capillary tip 34, and thus the liquid flowing through it, is heated.

Heat may also be applied to first vacuum chamber 14*a* using heating tape 47 (e.g. such as Fisher Cat. No. 11-463-22° C. type tape) wrapped around the outside of first vacuum chamber 14*a* in association with a power supply 46, as shown in FIG. 1. It should be understood that is also possible to provide heat to the system by heating the Q0 rods directly or other assemblies within vacuum chamber 14 which can assist droplet desolvation using such phenonemon as black body radiation and heating of residual gases. It should also be noted that by heating these components, deleterious contamination effects can also be avoided.

While it is desirable to use heating methods as discussed above to desolvate the Taylor cone of the liquid charge stream 23, it should be understood that if too much heat is applied to capillary tube 16, not all of liquid charge stream 23 will pass through aperture 26 in lens 18. As heat is applied, the droplet surface tension of the liquid is reduced and the liquid charge density will be able to overcome the surface tension sooner which reduces the length of the Taylor cone of liquid charge stream 23. This increases the possibility that ions will strike lens 18. Further, when added heat causes the liquid to boil, gas bubbles will disrupt the shape of the liquid at the capillary tip, causing unstable charging of the Taylor cone of liquid charge stream 23.

FIG. 6 shows an alternative liquid charge heating technique, namely a microwave generator 72 configured within ion source apparatus 10 for heating and thus, for promoting the desolvation of the liquid droplets from the Taylor cone of liquid charge stream 23. This configuration provides a standing wave of energy at the entrance to the first vacuum chamber 14*a*, the energy of which causes desolvation of the liquid droplets of the Taylor cone of the liquid charge stream 23, preferably in the vicinity of the entrance rod set Q0. It should be understood that other methods of conventionally known liquid droplet desolvation could be used in conjunction with the microwave heating method described above.

It should be understood that many different conventionally known ion transport and containment techniques may also be used within the present apparatus. One particularly noteworthy containment mechanism for directing ions into mass spectrometer 24 is the well known ion funnel 92 as shown in FIG. 6 and as described in "A Novel Ion Funnel for Focusing Ions at Elevated Pressures using Electrospray Ion Mass Spectrometry" by Richard Smith et al., Rapid Comm. Mass Spec. 11, 1813–1817 (1997). It has been experimentally determined that maximum efficiency results when ion funnel 92 is operated at about 130 pascals.

It should also be also understood that where the sample flow rate exceeds approximately 5 microliters per minute, the flow from analyte source 22 (FIG. 1) must be reduced to this maximum in order to conform to the ESI conditions of a single Taylor cone. Often, this is not convenient, and it is easier to adapt an ion spray source to accommodate high flow rates so that it delivers substantially liquid ion current to the first vacuum region 14*a*, as shown in FIG. 7. Liquid sample flows through a bore 74 of an ion source capillary 76 and emerges from a capillary tip 77. A voltage difference between the liquid in the capillary 76 and the cone-shaped lens 18 typically creates multiple Taylor cones of the liquid from the capillary tip outer edge 79 (shown schematically). High speed gas flowing axially between a nebulizer tube 78 and capillary 76, reduces the size of the larger charged droplets. The capillary tip 77 is placed close enough to the aperture 26 of lens 18 to ensure that a significant ion current of substantially liquid form flows through aperture 26. The high speed nebulizer gas assists in transporting charged liquid quickly towards the aperture 26, while the cone shape of lens 18 allows for a smooth flow of the nebulizer gas over the surface of lens 18. In FIG. 7, aperture 26 is sized to have a diameter of approximately 250 micrometers, the distance between the capillary tip 77 and the lens aperture 26 is approximately 1 millimeter and the diameter of the capillary bore 74 is typically greater than 100 micrometers. Although a single on-axis ion spray capillary 76 and nebulizer tube 78 are shown, multiple simultaneous sprayers could easily be configured for use. An ion spray could have a high flow rate of, for example, 200 microliters per minute. At this flow rate, it is only necessary for a small fraction, for example, 5% to pass through the aperture 26, and this will still give an adequate ion current.

Although the use of first vacuum chamber 14*a* as the only intermediate chamber between ion source chamber 12 (at substantially atmospheric pressure) and second vacuum chamber 14*b* (at pressures necessary for satisfactory mass spectral performance) has been described, it should be understood that a series of said chambers, each having successively lower pressures, could be used in place of first vacuum chamber 14*a*. Further, each chamber could be provided with one or more aforementioned containment mechanisms. Also, although entrance rod set Q0 in vacuum chamber 14*a* has been described as quadrupolar it should be understood that multipolar configurations such as hexapole or octopole are possible. In addition, techniques to create an axial field using ion containment such as the apparatus described in U.S. Pat. No. 5,847,386, could also be applied to ion source apparatus 10.

By appropriately selecting a particular set of capillary dimensions, lens or barrier apertures, capillary to counter-electrode voltage and spacing, capillary to lens or barrier spacing, surrounding pressure and heat, an appropriate combination of desolvation devices, an appropriate combination of vacuum chambers for desolvation and ion transport, the present invention provides the advantages of improved flow of ions into vacuum from an electrospray source such that a low volume of gas is admitted into the vacuum chamber along with the ions, such that corona effects are avoided, such that boiling does not occur, and such that the lab footprint of requisite pumping equipment is reduced.

The lens 18 or barrier 19 have been described as separating an atmospheric pressure region from a vacuum region, and it has been noted that the pressure in chamber 12 could be up to 266 pascals (i.e. 2 atmospheres). However, in general terms, the essential concept is to maintain the outlet of capillary tube 16 in a relatively high pressure environment. The gas pressure surrounding capillary tube 16 needs to be high enough to prevent premature boiling of the solvent, so that a stable Taylor cone is formed. The gas pressure also needs to be high enough to prevent corona discharge (very low pressures can prevent corona discharge, but are unacceptable on the boiling criterium just mentioned). The capillary outlet is placed close enough to an aperture in a lens or the like, such that the Taylor cone extends through the aperture into a second lower pressure chamber, before it substantially disperses or breaks down into charged droplets. The pressure in the low pressure chamber will in general depend upon the requirements of other elements housed by the low pressure chamber. For example, if quadrupole rod sets or other ion focussing devices are used in the low pressure chamber, their characteristics will determine a desired pressure in the low pressure chamber.

Thus, the technique of the present invention provides the advantages of discharging the electrospray into a high pressure region, while enabling all, or substantially all, of the electrospray stream to be transferred into a low pressure region, where the ions can be desolvated, collected and focussed. This is expected to give a very high level of efficiency for ion generation and much reduced ion loss. Additionally, only a small aperture is required between the two pressure regions, thus considerably reducing the pumping requirements in the low pressure region.

It will be appreciated that the ion source or gas phase ions of the present invention can be supplied to any suitable ion mobility separator downstream of first vacuum chamber 14*a*, possibly for application to any suitable spectrometer, including tandem mass spectrometers, time of flight (TOF) spectrometers, and in general any mass analyzer or mass spectrometer requiring desolvated ions in a very low pressure environment.

As will be apparent to persons skilled in the art, various modifications and adaptations of the structure described above are possible without departure from the present invention, the scope of which is defined in the appended claims.

What is claimed is:

1. An apparatus for providing gas phase ions in a relatively low pressure region from a liquid, the apparatus comprising:

(a) a capillary tube, said capillary tube having an input for receiving the liquid, a longitudinal bore, and an outlet for discharging said liquid at a preset flow rate into a first region at a relatively high pressure;

(b) a first interface element with an aperture therein and separating said first region from a second region at a relatively low pressure;

(c) an electrode located downstream from the outlet of the capillary tube; and (d) a voltage source for generating a voltage potential between said liquid in the capillary tube and said electrode;

wherein the outlet of the capillary tube is aligned with the aperture of the first interface element and is positioned directly in front of, and in close proximity to the aperture of the first interface element, whereby, in use, with a sufficient voltage potential applied between the liquid and the electrode to form an electric field sufficient to cause the liquid stream flowing through the outlet of the capillary tube at the preset flow rate to become a liquid stream in the form of a Taylor cone having a jet region that originates at the outlet of the capillary tube and flows through the aperture of the first interface element into the second region and substantially desolvates into gas phase ions in the second region, and wherein the spacing between the outlet of the capillary tube and the aperture of the first interface element is such that the jet region of the Taylor cone is positioned within the aperture of the first interface element so that the liquid stream disperses into charged droplets substantially in the second region.

2. An apparatus as claimed in claim 1, which includes heating means for supplying energy to droplets in the second region to promote vaporization.

3. An apparatus as claimed in claim 2, wherein the heating means comprises a laser mounted such that the beam from the laser intersects the liquid stream as it emerges into the second region through the aperture of the first interface element.

4. An apparatus as claimed in claim 2, which further comprises a first chamber defining the first region with the capillary tube located in the first chamber, second chamber defining the second region, and wherein the heating means includes means for heating the second chamber.

5. An apparatus as claimed in claim 4, wherein the heating means comprises at least one of: means for supplying gas to the second chamber and for heating the gas; a laser for irradiating the droplets to heat said droplets; a microwave generation means for heating droplets with microwave energy; an infrared heater for heating said droplets with infrared heat; and a heater including a length of heating tape wrapped around the outside of the second chamber to provide thermal heat to said droplets.

6. An apparatus as claimed in claim 5, which additionally includes means for heating the capillary tube, to promote vaporization of droplets.

7. An apparatus as claimed in claim 4, which includes an ion guide in the second chamber for collecting and guiding ions.

8. An apparatus as claimed in claim 4, which includes a third chamber and pump means for evacuating the second and third chambers to a sub-atmospheric pressure, a mass spectrometer located in the third chamber, a second interface element separating the second and third chambers, and a further aperture in the second interface element providing communication between the second and third chambers, wherein the apparatus is configured to be operated such that the pressure in the second chamber is less than the pressure in the first region and the pressure in the third chamber is less than the pressure in the second chamber.

9. An apparatus as claimed in claim 1, wherein the diameter of the outlet of the capillary tube is less than or equal to the diameter of the aperture of the first interface element.

10. An apparatus as claimed in claim 1, wherein the diameter of the outlet of the capillary tube is in the range of 12 micrometers and 125 micrometers.

11. An apparatus as claimed in claim 1, wherein the diameter of the aperture of the first interface element is in the range of 5 micrometers to 500 micrometers.

12. An apparatus as claimed in claim 10, wherein the diameter of the aperture of the first interface element is in the range of 5 micrometers to 500 micrometers.

13. An apparatus as claimed in claims 1, 10, 11 or 12, wherein the outlet of the capillary tube is spaced from the aperture of the first interface element by a distance in the range of 50 and 500 micrometers.

14. An apparatus as claimed in claim 1, wherein the voltage source is capable of providing a potential difference between said capillary tube and said electrode in the range of 500 volts and 1600 volts.

15. An apparatus as claimed in claim 1, wherein a piezoelectric device is coupled to the capillary tube for applying a series of pressure pulses to the liquid within the capillary tube to cause said capillary tube to expel a series of liquid stream droplets.

16. An apparatus as claimed in claim 1, wherein a piezoelectric device is coupled to the capillary tube for applying a series of pressure pulses to the liquid within the capillary tube, the frequency of said series of pressure pulses being synchronized with the frequency of operation of the laser.

17. An apparatus as claimed in claim 3, wherein the laser comprises a solid state laser.

18. An apparatus as claimed in claim 7, wherein the ion guide in the second chamber comprises one of a quadrupole rod set and an ion funnel.

19. An apparatus as claimed in claim 1, wherein the capillary tube is conductive.

20. An apparatus as claimed in claim 1, wherein the first interface element is conductive and wherein said first interface element and said electrode are integral with one another.

21. An apparatus as claimed in claim 1, wherein the first interface element is an insulator.

22. An apparatus as claimed in claim 1, which additionally includes a nebulizer tube axially located around the capillary tube for providing a flow of relatively high speed gas coaxially with the charged liquid stream.

23. An apparatus as claimed in claim 1, wherein the first interface element is provided with a bore, and wherein a cap is provided mounted within the bore and around the capillary tube, to define a tip chamber into which the outlet of the capillary tube opens, the cap including holes providing communication between the tip chamber and the first region and providing the aperture.

24. An apparatus as claimed in claim 23, which includes at least one of: a shoulder on the capillary tube locating the cap axially on the capillary tube, and cooperating shoulders on the cap and the bore of the first interface element, locating the cap within the bore of the first interface element.

25. An apparatus as claimed in claim 24, wherein the cap is formed of electrically conductive material, and wherein an insulator is provided between the cap and the capillary tube.

26. An apparatus as claimed in claim 24 or 25, which includes a seal between the cap and the bore of the first interface element.

27. An apparatus for providing gas phase ions in a relatively low pressure region from a liquid including a matrix material, the apparatus comprising:

(a) a capillary tube, said capillary tube having an input receiving the liquid, a longitudinal bore, and an outlet for discharging said liquid at a preset flow rate into a first region at a relatively high pressure;

(b) pulsing means coupled to the capillary tube for providing a series of pressure pulses to the liquid within the capillary tube to cause said capillary tube to expel a series of liquid stream droplets;

(c) a first interface element with an aperture therein and separating said first region from a second region at a relatively low pressure;

(d) desolvation means for desolvating the liquid stream droplets into gas phase ions in the second region, wherein the outlet of the capillary tube is aligned with the aperture of the first interface element and is positioned directly in front of, and in close proximity to, the aperture of the first interface element, whereby, in use, when said pulsing means provides sufficient pulsing action to the capillary tube to cause the liquid stream flowing through the outlet of the capillary tube at the preset flow rate to become pulsed liquid stream that originates at the outlet of the capillary tube and flows through the aperture of the first interface element into the second region, said desolvation means interacts with said matrix material to create reagent ions and to substantially desolvate said pulsed liquid stream into gas phase ions in the second region, and wherein the spacing between the outlet of the capillary tube and the aperture of the first interface element is such that the liquid stream issuing from the outlet of the capillary tube is substantially drawn through the aperture of the first interface element into the second region before dispersing into charged droplets in the second region.

28. An apparatus as claimed in claim 27, wherein the pulsing means is a piezoelectric device.

29. An apparatus as claimed in claim 27, wherein the desolvation means comprises a laser for irradiating the droplets to heat said droplets.

30. An apparatus as claimed in claim 27, which includes a third chamber and pump means for evacuating the second and third chambers to a sub-atmospheric pressure, a mass spectrometer located in the third chamber, a second interface element separating the second and third chambers, and a further aperture in the second interface element providing communication between the second and third chambers, wherein the apparatus is configured to be operated such that the pressure in the second chamber is less than the pressure in the first region and the pressure in the third chamber is less than the pressure in the second chamber.

31. An apparatus as claimed in claim 27, wherein the first interface element is conductive.

32. An apparatus as claimed in claim 27, wherein the diameter of the outlet of the capillary tube is less than or equal to the diameter of the aperture of the first interface element.

33. An apparatus as claimed in claim 27, wherein the diameter of the outlet of the capillary tube is in the range of 12 micrometers and 125 micrometers.

34. An apparatus as claimed in claim 27, wherein the diameter of the aperture of the first interface element is in the range of 5 micrometers to 500 micrometers.

35. An apparatus as claimed in claim 33, wherein the diameter of the aperture of the first interface element is in the range of 5 to 500 micrometers.

36. An apparatus as claimed in claim 27, wherein the outlet of the capillary tube is spaced from the aperture of the first interface element by a distance in the range of 50 and 500 micrometers.

37. A method of forming gas phase ions in a relatively low pressure region from a liquid, the method comprising the steps of:

(a) directing the liquid through a capillary tube having an outlet to provide a liquid stream at a preset flow rate into a first region at a relatively high pressure;

(b) providing an electrode downstream from the outlet;

(c) providing a first interface element including an aperture and separating the first region from a second region at a relatively low pressure;

(d) positioning the capillary tube such that the outlet of the capillary tube is aligned with the aperture of the first interface element and is positioned in front of, and inclose proximity to, the aperture of the first interface element;

(e) applying an electric potential between the liquid within said capillary tube and the electrode to form an electric field sufficient to cause said liquid stream to form a liquid stream in the form of a Taylor cone having a jet region; and (f) locating the cutlet of the capillary tube at a such a close distance from the aperture such that said jet region of the Taylor cone is positioned within the aperture of the first interface element such that the liquid stream disperses into charged droplets substantially in the second region.

38. A method as claimed in claim 37, wherein the step of applying an electric potential to the liquid within the capillary tube consists of applying the electrical potential between the first interface element and the capillary tube.

39. A method as claimed in claim 37, further comprising heating the droplets in the second region to promote vaporization of the droplets.

40. A method as claimed in claim 37, which includes irradiating the liquid in the second region with electromagnetic radiation, to heat the liquid and promote vaporization of solvent.

41. A method as claimed in claim 40, which includes irradiating the liquid emerging from the aperture into the second region with a laser beam.

42. A method as claimed in claim 39, which includes heating the liquid in the second region by one of: providing a heated gas in the second region; and heating the liquid with microwave energy.

43. A method as claimed in claim 39, which additionally comprises heating the capillary tube, to heat the liquid, thereby to promote vaporization of liquid droplets in the second region.

44. A method as claimed in claim 39, which includes collecting and guiding the ions in the second region in an ion guide.

45. A method as claimed in claim 42, which includes the additional steps of:

(1) focusing the ions with the ion guide;

(2) providing a mass spectrometer and separating the mass spectrometer from the second region with a second interface element plate including a further aperture;

(3) causing the focused ions to pass through the further aperture into the mass spectrometer; and (4) mass analyzing the ions with the mass spectrometer.

46. A method as claimed in claim 45, which includes maintaining the pressure in the mass spectrometer at a lower pressure than the pressure in the second region.

47. A method of forming gas phase ions in a relatively low pressure region from a liquid containing a matrix material, the method comprising the steps of:

(a) directing the liquid through a capillary tube having an outlet to provide a liquid stream at a preset flow rate into a first region at a relatively high pressure;

(b) providing a first interface element including an aperture and separating the first region from a second region at a relatively low pressure;

(c) positioning the capillary tube such that the outlet of the capillary tube is aligned with the aperture of the first interface element and is positioned in front of, and in close proximity to, the aperture of the first interface element;

(d) applying pressure pulses to the capillary tube to cause said capillary tube to expel a series of liquid charge stream droplets to cause the liquid stream flowing through the outlet of the capillary tube to become a pulsed liquid stream that originates at the outlet of the capillary tube and flows through the aperture of the first interface element into the second region;

(e) locating the outlet of the capillary tube at a such a close distance from the aperture such that the liquid charge stream issuing from the outlet of the capillary the is substantially drawn through the aperture of the first interface element into the second region before dispersing into charged droplets in the second region; and (f) desolvation said droplets into gas phase ions in the second region.

48. A method as claimed in claim 47, wherein step (f) comprises heating the droplets in the second region to promote vaporization of the droplets.

49. A method as claimed in claim 47, wherein step (f) includes irradiating the liquid in the second region with electromagnetic radiation, to heat the liquid and promote vaporization of solvent.

50. A method as claimed in claim 49, wherein step (f) includes irradiating the liquid emerging from the aperture into the second region with a laser beam.

51. A method as claimed in claim 49, wherein step (f) includes heating the liquid in the second region by one of: providing a heated gas in the second region; and heating the liquid with microwave energy.

* * * * *